(12) United States Patent
Driesen et al.

(10) Patent No.: US 9,137,130 B2
(45) Date of Patent: Sep. 15, 2015

(54) DYNAMIC NETWORK LOAD FORECASTING

(75) Inventors: Volker Driesen, Walldorf (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 1028 days.

(21) Appl. No.: 13/240,595

(22) Filed: Sep. 22, 2011

(65) Prior Publication Data

US 2013/0080617 A1 Mar. 28, 2013

(51) Int. Cl.
*G06F 15/173* (2006.01)
*H04L 12/26* (2006.01)
*H04L 12/911* (2013.01)
*H04L 12/24* (2006.01)
*H04L 29/08* (2006.01)
*H04W 28/08* (2009.01)
*G06F 11/34* (2006.01)

(52) U.S. Cl.
CPC .......... *H04L 43/0876* (2013.01); *H04L 41/147* (2013.01); *H04L 47/822* (2013.01); *H04L 47/823* (2013.01); *H04L 67/306* (2013.01); *G06F 11/3442* (2013.01); *H04W 28/08* (2013.01)

(58) Field of Classification Search
CPC ... H04W 28/08; H04L 47/822; H04L 47/823; G06F 9/5083; G06F 11/3442
USPC .................................................. 709/203–226
See application file for complete search history.

(56) References Cited

U.S. PATENT DOCUMENTS

| | | | |
|---|---|---|---|
| 7,523,142 B2 | 4/2009 | Driesen et al. | |
| 7,657,575 B2 | 2/2010 | Eberlein et al. | |
| 7,720,992 B2 | 5/2010 | Brendle et al. | |
| 7,734,648 B2 | 6/2010 | Eberlein | |
| 7,739,387 B2 | 6/2010 | Eberlein et al. | |
| 7,971,209 B2 | 6/2011 | Eberlein et al. | |
| 2007/0239800 A1 | 10/2007 | Eberlein | |
| 2008/0082575 A1 | 4/2008 | Peter et al. | |
| 2008/0288960 A1 | 11/2008 | Eberlein et al. | |
| 2009/0144721 A1 | 6/2009 | Wagner et al. | |
| 2010/0153341 A1 | 6/2010 | Driesen | |
| 2010/0228788 A1 | 9/2010 | Eberlein | |
| 2010/0332585 A1 | 12/2010 | Driesen | |
| 2011/0145571 A1 | 6/2011 | Schmidt-Karaca et al. | |
| 2011/0270795 A1* | 11/2011 | Smith et al. | 706/52 |
| 2012/0137002 A1* | 5/2012 | Ferris et al. | 709/226 |
| 2012/0310870 A1* | 12/2012 | Caves et al. | 706/14 |
| 2013/0339956 A1* | 12/2013 | Murase et al. | 718/1 |

OTHER PUBLICATIONS

U.S. Appl. No. 12/970,625, filed Dec. 16, 2010, Driesen.
U.S. Appl. No. 13/162,442, filed Jun. 16, 2011, Said et al.

* cited by examiner

*Primary Examiner* — Jeong S Park
(74) *Attorney, Agent, or Firm* — Fish & Richardson P.C.

(57) ABSTRACT

The present disclosure involves computer-implemented methods, software, and systems for optimizing the utilization of network infrastructure resources through predictive analysis. A computer-implemented method includes calculating, using at least one hardware processor, at least one user network load profile for each user profile of a set of user profiles, calculating a predicted dynamic network load using the at least one user network load profile for each user profile of the set of user profiles, transferring the predicted dynamic network load to an at least one network infrastructure resource, and adjusting the capacity of the at least one available network infrastructure resource.

27 Claims, 2 Drawing Sheets

FIG. 1

DYNAMIC NETWORK LOAD FORECASTING

TECHNICAL FIELD

The present disclosure relates to computer-implemented methods, software, and systems for optimizing the utilization of network infrastructure resources through predictive analysis.

BACKGROUND

Infrastructure costs are a significant factor in network operation costs. With a given network architecture and available data center network infrastructure resources, efficient utilization of available network infrastructure resources helps reduce overall network operation costs. On-demand network services, such as those provided by cloud-computing and other distributed network solutions, are strongly time-dependent. Another important factor affecting efficient allocation of network infrastructure resources is mobility. Network load demand from mobile users may be highly dynamic and may originate from a myriad of changing time zones. In order to ensure satisfaction of service level agreements at any time, network providers often attempt to anticipate network load demand and purposely overprovision the given network architecture with unnecessary network infrastructure resources. Overprovisioning of network infrastructure resources usually results in unused or under-utilized network infrastructure resources which is both inefficient and wasteful of business resources.

SUMMARY

The present disclosure relates to computer-implemented methods, software, and systems for optimizing the utilization of network infrastructure resources through predictive analysis. One computer-implemented method includes calculating, using at least one hardware processor, at least one user network load profile for each user profile of a set of user profiles, calculating a predicted dynamic network load using the at least one user network load profile for each user profile of the set of user profiles, transferring the predicted dynamic network load to an at least one network infrastructure resource, and adjusting a capacity of the at least one available network infrastructure resource.

While generally described as computer-implemented software embodied on a non-transitory computer readable storage device that processes and transforms respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DETAILED DESCRIPTION

The disclosure generally describes computer-implemented methods, software, and systems for optimizing the utilization of network infrastructure resources through predictive analysis. Specifically described are computer-implemented methods, software, and systems for optimizing the utilization of network infrastructure resources through calculating a user network load profile for each user profile of a set of user profiles, calculating a predicted dynamic network load based upon the calculated user network load profiles, transferring the predicted dynamic network load to a network infrastructure, and adjusting a capacity of an available network infrastructure resource based upon the predictive dynamic load.

Prior to the computer-implemented methods, software, and systems described here, determination of a predicted network load was generally calculated by either static system sizing or historical data. Static system sizing network load calculation is generally calculated for a user role by multiplying the number of users per the user role by a predetermined static network load per user role. A user role may be, for example, a CEO, a manager, a secretary, or another suitable time user role.

Historical data network load calculation is generally based upon prior statistical measurements of network infrastructure resource loads as a function of time. A network infrastructure resource may be, for example, a server, a client, a database, a mobile device, a network switch or hub, a virtual machine acting in various capacities, or another suitable network infrastructure resource. To calculate a predicted network load for at least one network infrastructure resource, historical data associated with a time or time frame of interest for the at least one network infrastructure resource is generally used as a predictive indicator of network load for that network infrastructure resource. As static data is necessary fixed and inflexible, over-provisioning of network infrastructure resources is a normal result of depending upon such data. The use of historical data in network load calculations often results in over-provisioning of network infrastructure resources because network capacity thresholds are set to generally prevent network capacity shortages and allow enough time for network hosting providers to add new network capacity. Neither static system sizing nor historical data network load calculation provides a predicted network load with a necessary degree of predictive accuracy in order to optimize the utilization of network infrastructure resources.

Figure 1:
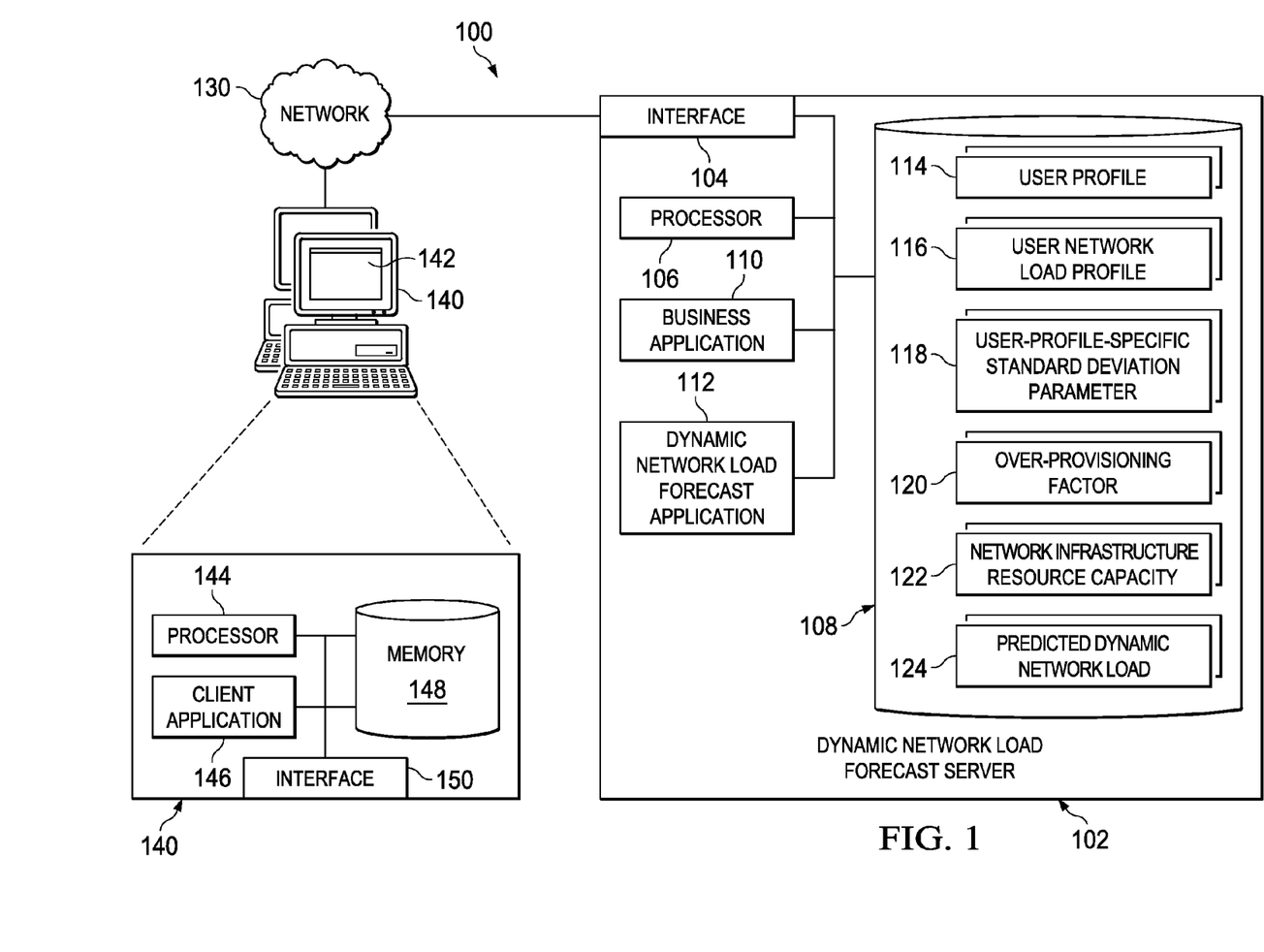
FIG. 1 illustrates an example environment for implementing various features of a system for optimizing the utilization of network infrastructure resources through predictive analysis.

Turning now to the figures, FIG. 1 illustrates an example environment 100 for optimizing the utilization of network infrastructure resources through predictive analysis in accordance with one implementation of the present disclosure. The illustrated example environment 100 includes, or is communicably coupled with, at least one dynamic network load forecast server 102 and at least one client 140. At least one client 140 and the dynamic network load forecast server 102 may communicate across or via network 130. In general, example environment 100 depicts an example configuration of a system capable of optimizing the utilization of cloud data center infrastructure resources through predictive analysis. In other implementations, the elements illustrated within the dynamic network load forecast server 102 and/or the client 140 may be included in or associated with different and/or additional servers, clients, networks, or locations other than those illustrated in FIG. 1. For example, the components illustrated within the dynamic network load forecast server 102 may be included in multiple servers, cloud-based networks, or other locations accessible to the dynamic network load forecast server 102 (e.g., either directly or via network 130).

In general, the dynamic network load forecast server 102 is any server that optimizes the utilization of network infrastructure resources through predictive analysis via the dynamic network load forecast application 112, where the dynamic network load forecast application 112 is associated with at least one user profile 114 instance.

For example, each dynamic network load forecast server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some implementations, other non-Java based servers and or systems could be used for the dynamic network load forecast server 102. In some implementations, each dynamic network load forecast server 102 may store a plurality of various other applications (not illustrated), while in other implementations, each dynamic network load forecast server 102 may be a dedicated server meant to store and execute a particular dynamic network load forecast application 112 and its related functionality, as well as a set of particular dynamic network load forecast applications 112. In some implementations, the load forecast server 102 may comprise a web server or be communicably coupled with a web server, where the particular load forecast application 132 associated with that load forecast server 102 represents a web-based (or web-accessible) application accessed and executed on an associated at least one client 140 to perform the programmed tasks or operations of the corresponding dynamic network load forecast application 112.

At a high level, the dynamic network load forecast server 102 comprises an electronic computing device operable to receive, transmit, process, store, or manage data and information associated with the example environment 100. The dynamic network load forecast server 102 illustrated in FIG. 1 can be responsible for receiving application requests from at least one client 140 (as well as any other entity or system interacting with the dynamic network load forecast server 102), responding to the received requests by processing said requests in an associated dynamic network load forecast application 112, and sending the appropriate responses from the dynamic network load forecast application 112 back to the requesting client 140 or other requesting system. The dynamic network load forecast application 112 can also process and respond to local requests from a user locally accessing the associated dynamic network load forecast server 102. Accordingly, in addition to requests from the external client 140 illustrated in FIG. 1, requests associated with a particular dynamic network load forecast application 112 may also be sent from internal users, external or third-party customers, and other associated dynamic network load forecast applications 112, as well as any other appropriate entities, individuals, systems, or computers. In some implementations, the dynamic network load forecast application 112 may be a web-based application.

As used in the present disclosure, the term "computer" is intended to encompass any suitable processing device. For example, although FIG. 1 illustrates a single dynamic network load forecast server 102, example environment 100 can be implemented using any number of servers, as well as computers other than servers, including a server pool. Indeed, the dynamic network load forecast server 102 may be any computer or processing device such as, for example, a blade server, general-purpose personal computer (PC), Macintosh, workstation, UNIX-based workstation, tablet computer, or any other suitable device. In other words, the present disclosure contemplates computers other than general purpose computers, as well as computers without conventional operating systems. Further, the illustrated dynamic network load forecast server 102 may be adapted to execute any operating system, including Linux, UNIX, Windows, Mac OS, WebOS, iOS, Android, or any other suitable operating system.

In the illustrated implementation of FIG. 1, the dynamic network load forecast server 102 includes an interface 104, a processor 106, a memory 108, at least one business application 110, and at least one dynamic network load forecast application 112. While illustrated as a single component in the example environment 100 of FIG. 1, other implementations may illustrate the dynamic network load forecast server 102 as comprising multiple parts or portions accordingly.

The interface 104 is used by the dynamic network load forecast server 102 to communicate with other systems in a client-server or other distributed environment (including within example environment 100) connected to the network 130 (e.g., an associated client 140, as well as other systems communicably coupled to the network 130). FIG. 1 depicts both a server-client environment, but could also represent a cloud-computing network. Various other implementations of the illustrated example environment 100 can be provided to allow for increased flexibility in the underlying system, including multiple dynamic network load forecast servers 102 performing or executing at least one additional or alternative implementation of the dynamic network load forecast application 112, as well as other applications associated with or related to the dynamic network load forecast application 112. In those implementations, the different dynamic network load forecast servers 102 may communicate with each other via a cloud-based network or through the connections provided by network 130. Returning to the illustrated example environment 100, the interface 104 generally comprises logic encoded in software and/or hardware in a suitable combination and operable to communicate with the network 130. More specifically, the interface 104 may comprise software supporting at least one communication protocol associated with communications such that the network 130 or the interface's hardware is operable to communicate physical signals within and outside of the illustrated example environment 100.

Generally, the dynamic network load forecast server 102 may be communicably coupled with a network 130 that facilitates wireless or wireline communications between the components of the example environment 100 (i.e., between the dynamic network load forecast server 102 and at least one client 140), as well as with any other local or remote computer, such as additional clients, servers, or other devices communicably coupled to network 130, including those not illustrated in FIG. 1. In the illustrated example environment 100, the network 130 is depicted as a single network, but may be comprised of more than one network without departing from the scope of this disclosure, so long as at least a portion of the network 130 may facilitate communications between senders and recipients. In some implementations, at least one component associated with the dynamic network load forecast server 102 may be included within the network 130 as at least one cloud-based service or operation. The network 130 may be all or a portion of an enterprise or secured network, while in another implementation, at least a portion of the network 130 may represent a connection to the Internet. In some implementations, a portion of the network 130 may be a virtual private network (VPN). Further, all or a portion of the network 130 can comprise either a wireline or wireless link. Example wireless links may include cellular, 802.11a/b/g/n, 802.20, WiMax, and/or any other appropriate wireless link. In other words, the network 130 encompasses any internal or external network, networks, sub-network, or combination thereof operable to facilitate communications between various computing components inside and outside the illustrated example environment 100. The network 130 may communicate, for example, Internet Protocol (IP) packets, Frame Relay frames, Asynchronous Transfer Mode (ATM) cells, voice, video, data, and other suitable information between network addresses. The network 130 may also include at least one local area network (LAN), radio access network (RAN), metropolitan area network (MAN), wide area network (WAN), all or a portion of the Internet, and/or any other communication system or systems in at least one location.

As illustrated in FIG. 1, the dynamic network load forecast server 102 includes a processor 106. Although illustrated as a single processor 106 in the business process server 102, two or more processors may be used in the dynamic network load forecast server 102 according to particular needs, desires, or particular implementations of example environment 100. The processor 106 may be a central processing unit (CPU), a blade, an application specific integrated circuit (ASIC), a field-programmable gate array (FPGA), or another suitable component. Generally, the processor 106 executes instructions and manipulates data to perform the operations of the dynamic network load forecast server 102 and, specifically, the functionality associated with the corresponding dynamic network load forecast application 112. In one implementation, the dynamic network load forecast server 102 processor 106 executes the functionality required to receive and respond to requests and instructions from the at least one client 140, as well as the functionality required to perform the operations of an associated business application 110 and a dynamic network load forecast application 112.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated example environment 100, each processor 106 executes the corresponding dynamic network load forecast application 112 stored on the associated dynamic network load forecast server 102. In some implementations, a particular dynamic network load forecast server 102 may be associated with the execution of two or more dynamic network load forecast applications 112, as well as distributed applications executing across two or more dynamic network load forecast servers 102.

At least one business application 110 is illustrated within the dynamic network load forecast server 102, and can be executed by processor 106. The business application 110 can be any application, program, module, process, or other software that may execute, change, delete, generate, or otherwise manage information associated with a particular dynamic network load forecast server 102, and in some cases, a business process performing and executing business process-related events. In particular, business processes communicate with other users, applications, systems, and components to send and receive events. In some implementations, a particular business application 110 may operate in response to and in connection with at least one request received from an associated client 140. Additionally, a particular business application 110 may operate in response to and in connection with at least one request received from other business applications 110, including a business application 110 associated with another dynamic network load forecast server 102. In some implementations, each business application 110 may represent a web-based application accessed and executed by remote clients 140 via the network 130 (e.g., through the Internet, or via at least one cloud-based service associated with the dynamic network load forecast application 112). For example, a portion of a particular business application 110 may be a web service associated with the business application 110 that is remotely called, while another portion of the business application 110 may be an interface object or agent bundled for processing at a remote client 140. Moreover, any or all of a particular business application 110 may be a child or sub-module of another software module or enterprise application (not illustrated) without departing from the scope of this disclosure. Still further, portions of the particular business application 110 may be executed or accessed by a user working directly at the dynamic network load forecast server 102, as well as remotely at a corresponding client 140.

At a high level, each dynamic network load forecast application 112 is any application, program, module, process, or other software that may execute, change, delete, generate, or otherwise manage information associated with a particular dynamic network load forecast server 102. Specifically, each dynamic network load forecast application 112 automatically forecasts a dynamic network load associated with at least one available network infrastructure resource associated with example environment 100. In some implementations, a particular dynamic network load forecast application 112 may operate in response to and in connection with at least one request received from an associated client 140. In some implementations, a particular dynamic network load forecast application 112 may operate in response to and in connection with at least one request received from at least one business application 110. Additionally, a particular dynamic network load forecast application 112 may operate in response to and in connection with at least one request received from other dynamic network load forecast applications 112, including a dynamic network load forecast application 112 associated with another dynamic network load forecast server 102. Each dynamic network load forecast application 112 may be on the same system as the business application 110 or on a different, communicably coupled system. In some implementations, each load forecast application 112 may represent a web-based application accessed and executed by remote clients 140 via the network 130 (e.g., through the Internet, or via at least one cloud-based service associated with the dynamic network load forecast application 112). Further, while illustrated as internal to the dynamic network load forecast server 102, at least one user profile 114 associated with a particular dynamic network load forecast application 112 may be stored, referenced, modified, or deleted remotely. For example, a portion of a particular dynamic network load forecast application 112 may be a web service associated with the dynamic network load forecast application 112 that is remotely called, while another portion of the dynamic network load forecast application 112 may be an interface object or agent bundled for processing at a remote client 140. Moreover, any or all of a particular dynamic network load forecast application 112 may be a child or sub-module of another software module or enterprise application (not illustrated) without departing from the scope of this disclosure. Still further, portions of the particular dynamic network load forecast application 112 may be executed or accessed by a user working directly at the dynamic network load forecast server 102, as well as remotely at a corresponding client 140.

All, some, or none of the modules may be included in other dynamic network load forecast servers 102. Additionally, some or all of the modules may be combined with each other, as well as integrated into the functionality provided by another component.

The dynamic network load forecast server 102 also includes a memory 108 for storing data and program instructions. The memory 108 may include any memory or database module and may take the form of volatile or non-volatile memory including, without limitation, magnetic media, optical media, random access memory (RAM), read-only memory (ROM), flash memory, removable media, or any other suitable local or remote memory component. The memory 108 may store various objects or data, including classes, frameworks, applications, backup data, business objects, jobs, web pages, web page templates, database tables, process contexts, repositories storing services local to the dynamic network load forecast server 102, and any other appropriate information including any parameters, variables, algorithms, instructions, rules, constraints, or references thereto associated with the purposes of the dynamic network load forecast server 102 and its dynamic network load forecast application 112. In some implementations, including a cloud-based system, some or all of the memory 108 may be stored remote from the dynamic network load forecast server 102, and communicably coupled to the dynamic network load forecast server 102 for usage. As illustrated, and further discussed individually below, memory 108 includes at least one user profile 114, at least one user network load profile 116, at least one user-profile-specific standard deviation parameter 118, at least one over-provisioning factor 120, a network infrastructure resource capacity 122, and at least one predicted dynamic network load 124.

In general, a client 140 is any computer device operable to connect or communicate with dynamic network load forecast server 102 using a wireless or wireline connection (i.e., network 130). In particular, the client 140 may be embodied as a mobile or non-mobile computing device. At a high level, each client 140 can include a processor 144, a GUI 142, a client application 146, a memory 148, and an interface 150. In general, the client 140 comprises an electronic computer device operable to receive, transmit, process, and/or store any appropriate data associated with a dynamic network load forecast applications 112. In some implementations, example environment 100 can be implemented using any number of clients 140.

The interface 150 of the client 140 may be similar to the interface 104 of the dynamic network load forecast server 102, in that it may comprise logic encoded in software and/or hardware in a suitable combination and operable to communicate with the network 130. More specifically, interface 150 may comprise software supporting on or more communication protocols such that the network 130 or hardware is operable to communicate physical signals to and from the client 140. Further, although illustrated as a single interface 150, the interface 150 may be implemented as multiple interfaces 150 in the client 140.

Similarly, memory 148 of the client 140 may include any memory or database module and may take the form of volatile or non-volatile memory including, without limitation, magnetic media, optical media, random access memory (RAM), read-only memory (ROM), removable media, or any other suitable local or remote memory component. For example, memory 148 may store a client application 146, backup data, parameters, cookies, variables, algorithms, instruction, rules, or reference thereto. As illustrated, memory 148 can include any suitable components to interpret and decode messages received at the client 140. Further, although illustrated as a single memory 148, the memory 148 may be implemented as multiple memories in the client 140.

In some implementations, processor 144 may be similar to processor 106. In other implementations, the processor 144 may be a processor designed specifically for use in client 140. Further, although illustrated as a single processor 144, the processor 144 may be implemented as multiple processors in the client 140. Regardless of the type and number, processor 144 executes instructions and manipulates data to perform the operations of the client 140, including operations to receive and process information from the dynamic network load forecast server 102, access data within memory 148, execute the client application 146, as well as perform other operations associated with the client 140.

The client application 146 of the client 140 may retrieve application-related information from a corresponding dynamic network load forecast server 102, or the client application may access a local cached set of client-application-related information (not illustrated) stored on the client 140. In some implementations, the client application 146 may be a web browser. In some implementations, the client application 146 can use parameters, metadata, and other information received at launch to access a particular set of data from the dynamic network load forecast server 102. Once a particular client application 146 is launched, a user can interactively process a task, event, or other information associated with the dynamic network load forecast server 102. Further, although illustrated as a single client application 146, the client application 146 may be implemented as multiple client applications in the client 140.

The GUI 142 of the client 140 is a graphical user interface operable to allow the user of the client 140 to interface with at least a portion of the system 100 for any suitable purpose, including to allow a user of the client 140 to interact with at least one client application 146 and with the dynamic network load forecast server 102. The term "Graphical User Interface", or GUI, may be used in the singular or plural to describe at least one graphical user interface and each of the displays of a particular graphical user interface. Therefore, the GUI 142 can be any graphical user interface, such as a generic web browser, touch screen, or command line interface (CLI) that processes information in the system 100 and efficiently presents the results to a user. Generally the GUI 142 provides the client 140 with an efficient and user-friendly presentation of data provided by or communication within the system 100. In particular, the GUI 142 may provide users of the client 140 with visualization representation of the client application 146 and other client 140 functionality. The GUI 142 may include a plurality of user interface UI elements such as interactive fields, pull-down lists, and buttons operable at the client 140.

While FIG. 1 is described as containing or being associated with a plurality of components, not all components illustrated within the illustrated implementation of FIG. 1 may be utilized in each implementation of the present disclosure. Additionally, at least one component described herein may be located external to example environment 100, while in other implementations, certain components may be included within or as a portion of at least one other described component, as well as other components not describes. Further, certain components illustrated in FIG. 1 may be combined with other components, as well as used for alternative or additional purposes, in addition to those purposes described herein.

Calculating a Predicted Dynamic Network Load.

Figure 2:
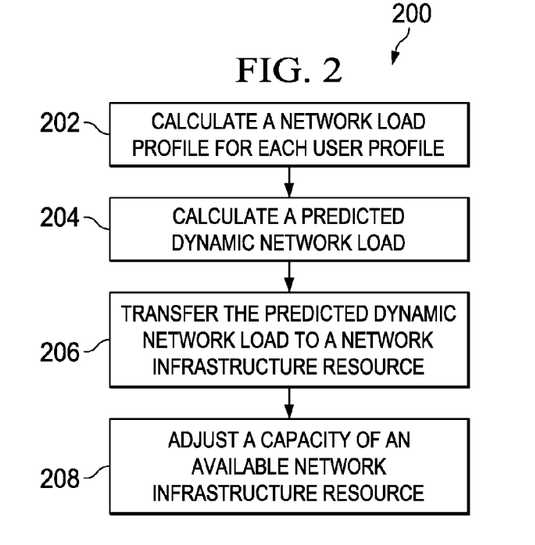
FIG. 2 is a flowchart of an example method for optimizing the utilization of network infrastructure resources through predictive analysis.

FIG. 2 illustrates a flowchart of an example method 200 for optimizing the utilization of network infrastructure resources through predictive analysis. For clarity of presentation, the description that follows generally describes method 200 in the context of example environment 100 illustrated in FIG. 1 and example method 300 illustrated in FIG. 3. However, it will be understood that method 200 may be performed, for example, by any other suitable system, environment, or combination of systems and environments, as appropriate.

In accordance with one implementation of the present disclosure, the predicted dynamic network load value may be measured by a holistic resource demand quantity (RDQ) unit defined by a standard benchmark calculations which are mapped to given network infrastructure resource hardware configurations. In other implementations, the predicted dynamic network load value may be measured by a fine-grained RDQ unit which is defined as a vector of quantities related to network infrastructure resource hardware, such as a central processing unit, random access memory, hard drive storage space, network input/output, and/or other suitable network infrastructure resource hardware. In other implementations, an RDQ unit may be defined by a value provided by a network infrastructure resource hardware vendor and/or manufacturer. In other implementations, the predicted dynamic network load value may be measured in an RDQ unit which is defined as a combination of the holistic, the fine-grained and/or the vendor/manufacturer provided values as defined above. In other implementations, any suitable unit may be used to measure the predicted dynamic network load value.

The predicted dynamic network load value may generally be represented by the following formula:

$$D(t, UB) = OPF * \text{sum over all } UB(ULP(t) + (SD*USD))$$

where D represents the predicted dynamic network load as a function of time (t) and the logged on user base (UB), OPF represents an over-provisioning factor, ULP represents a calculated user network load profile as a function of time t, SD represents a standard deviation parameter and USD represents a calculated user-profile-specific standard deviation parameter. As described by the above-mentioned formula, the predicted dynamic network load as a function of time t and the logged on user base UB is equal to the over-provisioning factor OPF multiplied by the sum over all users of the logged on user base UB where, for each user, the calculated user network load profile ULP as a function of time t associated with the user is added to a standard deviation parameter SD multiplied by a calculated user-profile-specific standard deviation parameter USD.

Generally, the over-provisioning factor OPF is a parameter used to adjust how much available capacity of an at least one network infrastructure resource is reserved as a buffer. This is useful in order to allow quick increases and/or decreases in the available capacity of the at least one network infrastructure resource responsive to unusual and/or unexpected capacity demands made of the at least one network infrastructure resource. In some implementations, the over-provisioning factor OPF initial value may be set as a predetermined value and then subsequently be changed as a result of at least one calculation. In other implementations the over-provisioning factor OPF may remain the predetermined value. In other implementations, the initial value of the over-provisioning factor OPF may be set using a benchmark calculation and then subsequently changed as a result of at least one calculation. In other implementations the over-provisioning factor OPF may remain the value determined using the benchmark calculation.

In some implementations, the initial value of standard deviation SD may be set to a predetermined value and then subsequently be changed as a result of at least one calculation. In other implementations the standard deviation SD may remain the predetermined value. In other implementations, the initial value of the standard deviation SD may be set using a benchmark calculation and then subsequently changed as a result of at least one calculation. In other implementations the standard deviation SD may remain the value determined using the benchmark calculation.

In some implementations, the standard deviation parameter SD is used to adjust how significantly a user with a non-regular time schedule (as reflected by the user-profile-specific standard deviation parameter USD value) affects the overall calculation of the predicted dynamic network load D. In some implementations, standard deviation parameter SD will be set to a high value for a small number of network users and set to a low value for a large number of network users. For a large number of network users, a low value for standard deviation parameter SD may be used due to the overall statistical effect of large numbers of network users averaging out user-specific standard deviations USD. In some implementations, the addition of the value associated with the multiplication of standard deviation parameter SD and user-profile-specific standard deviation parameter USD is optional.

In some implementations, at a high level, when a user logs into the example environment 100, the user's calculated user network load profile ULP is dynamically added to the predicted dynamic network load with the users network load adjusted based upon the user's geographic location. In these implementations, the user's predicted overall network load demand is assumed for a defined time unit. In some implementations, this time unit may be, for example, one minute, ten minutes, one hour, more than one hour, or some other suitable time unit. Therefore, the at least one dynamic network load forecast server is dynamically calculating a predicted network load in response to the logged on user base UB as a function of time t.

Referring to FIG. 2, method 200 begins at 202. At 202, at least one user network load profile is calculated for each user profile. The operation of 202 is described in further detail in FIG. 3. Generally, a user profile may be, for example, an account, a record, a file, data or the like used to identify a specific user of at least one network infrastructure resource and to record time-based activities of the user. In some implementations, the time-based activities of the user may be role-specific, personal, regular or irregular, scheduled or unscheduled, or other suitable time-based activity. In some implementations two or more user network load profiles may be calculated for each user profile. In some implementations, the at least one user profile may be stored external to example system 100 (not illustrated). In some implementations, for a new user, the new user's user network load profile value may be initially set to the average of all user network load profile values where the users have the same role as the new user. In some implementations, the initial new user's user network load profile value may be set to a predetermined value and then subsequently be changed as a result of at least one calculation. In other implementations the new user's user network load profile value may remain the predetermined value. In other implementations, the initial new user's user network load profile value may be set using a benchmark calculation and then subsequently changed as a result of at least one calculation. In other implementations the new user's user network load profile value may remain the value determined using the benchmark calculation. From 202, method 200 proceeds to 204.

At 204, a predicted dynamic network load D(t, UB) is calculated using the at least one user network load profile for each user profile of the set of user profiles in accordance with the above-described formula describing the calculation of a predicted dynamic network load. From 204, method 200 proceeds to 206.

At 206, the predicted dynamic network load is transmitted to an at least one network infrastructure resource. In some implementations, the predicted dynamic network load may be transmitted to, for example, a server, a client, a database, a mobile device, a network switch or hub, a virtual machine acting in various capacities, or another suitable network infrastructure resource. From 206, method 200 proceeds to 208.

At 208, a capacity of the at least one available network infrastructure resource is automatically adjusted. Generally, the required capacity of the at least one available network infrastructure resource is dynamic, and automatically adjusting the capacity lowers operation costs associated with the at least one available network infrastructure resource as compared to normally higher operation costs associated with manually adjusting the capacity of the at least one available network infrastructure resource. In some implementations capacity may encompass, for example, a value associated with attributes of a software product, a value based upon a benchmark calculation, network data throughput (i.e., bandwidth), data storage, processing speed, number of running applications, number of available physical and/or virtual machines, available data centers, or another suitable capacity. In some implementations, adjusting capacity may encompass activation/deactivation of network infrastructure resources including physical and/or virtual machines, moving virtual machines to physical machines with more/less available computing resources, modifying a virtual machine to provide more/less computing resources, activation/shutdown of partial and/or entire data centers, activation/removal of bandwidth throttles and/or caps, increasing/decreasing available network bandwidth, increasing/decreasing available data and/or application storage space, increasing/decreasing file system size, adding/removing a dialog instance, adding/removing work processes or available memory in dialog instances, or another suitable capacity adjustment. Method 200 stops following 208.

Calculating a User Network Load Profile.

Figure 3:
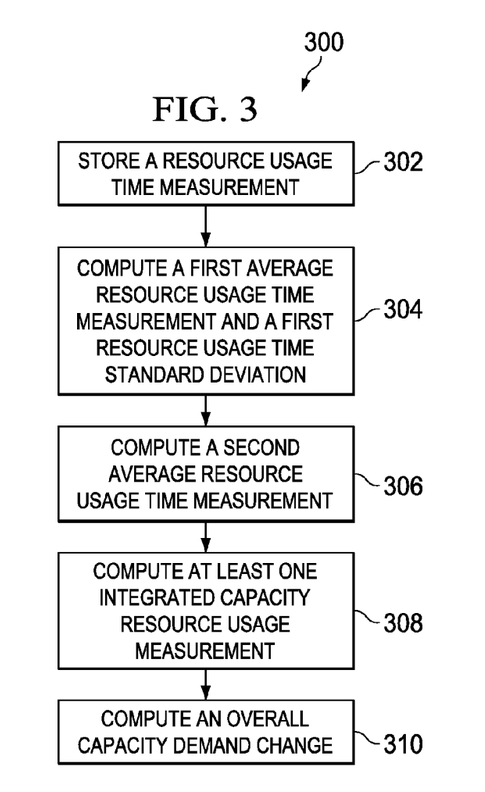
FIG. 3 is a flowchart of an example method for calculating a user network load profile for a user profile.

Referring to FIG. 3, FIG. 3 illustrates a flowchart of an example method 300 for calculating a user network load profile for a user profile. In some implementations, the user network load profile defines a personalized network load value associated with a user profile. In some implementations, for a new user, the initial user network load profile for the user profile may be set using a benchmark calculation and then subsequently changed as a result of at least one calculation. In other implementations, for a new user, the initial user network load profile for the user profile may be set using an average user network load profile of at least one other user and then subsequently changed as a result of at least one calculation.

Method 300 starts at 302. At 302, at least one resource usage time measurement associated with the user profile for a defined first time unit is stored. In some implementations, the defined first time unit may be, for example, one minute, ten minutes, one hour, one day, a non-regular distribution of measurement points in time, or another suitable time unit. For example, in an implementation where the defined first time unit is the 1-2 pm hour, for a user profile, at least one measurement of the network usage time for the 1-2 pm hour would be then stored. In some implementations, the at least one resource usage time measurement may be, for example, the maximum value of the at least one resource usage time measurements for the defined first time unit since the storage of the previous at least one resource usage time measurement, an aggregated at least one resource usage time measurement for the defined first time unit, or an average at least one resource usage time measurement for the defined first time unit. In some implementations, the at least one resource usage time measurement is stored in the memory of example environment 100. In some implementations, the number of at least one resource usage time measurements within a defined first time unit may be defined by, for example, a resource measurement value. The resource measurement value may be, for example every minute, every ten minutes, every hour, a non-regular distribution of measurement points in time, or another suitable resource measurement value. In other implementations, the at least one resource usage time measurement is stored in a memory external to the example environment 100 (not illustrated). In some implementations, the at least one resource usage time measurement may be associated with a specific network infrastructure resource. In other implementations, the at least one resource usage time measurement may be associated with two or more network infrastructure resources. In some implementations the stored at least one resource usage time measurement is normalized to a geographic reference associated with the user profile. In these implementations, the geographic reference may be, for example, a zip code, a country code, a mailing address, geographic coordinates, or another suitable geographic reference. In some implementations, the at least one resource usage time measurement may be enriched with other data, such as a day, a time, a network infrastructure resource identifier, or other suitable enrichment data. In some embodiments, at least one resource usage time measurement is taken for every period of time a user logs into and uses the system and the measurement data may be used for statistical purposes. From 302, method 300 proceeds to 304.

At 304, at least one first average resource usage time measurement and at least one first resource usage time standard deviation is calculated using the stored at least one resource usage time measurement. In some implementations, the at least one first average resource usage time measurement is calculated using the sum of the stored at least one resource usage time measurements divided by the number of at least one resource usage time measurement values determined by the resource measurement value. For example, there may be sixty stored resource time measurements for the hour 1-2 pm. In this implementation, to calculate the at least one first average resource usage time measurement, the sixty stored resource time measurements would be summed and divided by sixty. In some implementations, the number of data values is determined from the first defined resource measurement value and the first defined time unit. In other implementations, the number of available data values may be stored external to the example environment 100.

In some implementations, the at least one first resource usage time standard deviation is calculated for the at least one identically defined first time unit. In some implementations, for a new user, the initial first resource usage time standard deviation value may be set to zero. In other implementations, for a new user, initial first resource usage time standard deviation value for the user profile may be set using an average first resource usage time standard deviation value of at least one other user and then subsequently changed as a result of at least one calculation. From 304, method 300 proceeds to 306.

At 306, at least one second average resource usage time measurement is calculated utilizing the at least one first average resource usage time measurement in relation to a second defined time unit. In some implementations, a second defined time unit may be, for example, all work days in a week, all days in a month, all days in a year, or another suitable time unit. In some implementations, the at least one second average resource usage time measurement is calculated using the sum of stored at least one resource usage time measurements divided by a number of a number of values associated with the second defined time unit. For example, the second defined time unit may be a business work week of Monday through Friday. In this implementation, to calculate the at least one first average resource usage time measurement, five stored first resource usage time measurements associated with Monday through Friday of a business work week would be summed and then divided by five (the number of days in the business work week). In some implementations, the number of values is determined from the second defined time unit. In other implementations, the number of available data values may be stored apart from the second defined time unit or external to the example environment 100.

At 308, at least one integrated capacity resource usage measurement for the at least one second defined time unit utilizing the at least one second average resource usage time measurement is calculated. In some implementations, the at least one integrated capacity resource usage measurement is calculated using a linear extrapolation. In other implementations, the at least one integrated capacity resource usage measurement is calculated using an average comparison of at least one second average resource usage time measurements. From 308, method 300 proceeds to 310.

At 310, an overall capacity demand change associated with the user network load profile is calculated utilizing the at least one integrated capacity resource usage measurement for at least one identically defined second time unit. In some implementations an increase in the overall capacity demand change associated with the user network load profile is used to increase the user network load profile of the associated user. A decrease in the overall capacity demand change associated with the user network load profile may also be used to decrease the user network load profile of the associated user. Method 300 stops following 310.

Feedback Cycle and Optimization.

Figure 4:
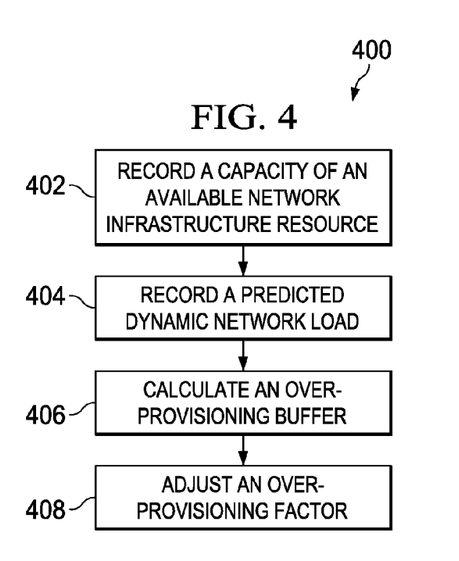
FIG. 4 illustrates a flowchart of an example method for calculating feedback values in order to optimize an over-provisioning factor.

Referring now to FIG. 4, FIG. 4 illustrates a flowchart of an example method 400 for calculating feedback values in order to optimize an over-provisioning factor. Method 400 starts at 402. At 402, the capacity of the at least one available network infrastructure resource is recorded. In some implementations, the capacity of the at least one available network infrastructure resource is recorded into the memory of example environment 100. In other implementations, the capacity of the at least one available network infrastructure resource is stored in a memory external to the example environment 100 (not illustrated). From 402, method 400 proceeds to 404.

At 404, the calculated predicted dynamic network load is recorded. In some implementations, the calculated predicted dynamic network load is recorded into the memory of example environment 100. In other implementations, the calculated predicted dynamic network load is stored in a memory external to the example environment 100 (not illustrated). From 404, method 400 proceeds to 406.

At 406, an over-provisioning buffer value is calculated as the difference of the capacity of the at least one available network infrastructure resource and the calculated predicted dynamic network load. From 406, method 400 proceeds to 408.

At 408, the over-provisioning factor is adjusted based upon the calculated value of the over-provisioning buffer value. In some implementations the over-provisioning factor may be lowered as the value of the difference between the over-provisioning buffer value and the calculated predicted dynamic network load approaches zero. Method 400 stops following 408.

In some implementations, the predicted dynamic network load calculation method may also include additional parameters such as overhead, predicted demand for batch jobs, administrative activities, test activities, and other suitable parameters.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, example environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented dynamic network load forecast method, comprising:
  calculating, using at least one hardware processor, at least one user network load profile for each user profile of a set of user profiles, wherein the calculation of the at least one user network load profile includes:
    storing at least one resource usage time measurement associated with the user profile for a defined first time unit as defined by at least one resource measurement value;
    calculating at least one first average resource usage time measurement and at least one first resource usage time standard deviation using the stored at least one resource usage time measurement and the at least one resource measurement value;
    calculating at least one second average resource usage time measurement utilizing the at least one first average resource usage time measurement in relation to a second defined time unit; and
    calculating at least one integrated capacity resource usage measurement for the at least one second defined time unit utilizing the at least one second average resource usage time measurement; and calculating an overall capacity demand change utilizing the at least one integrated capacity resource usage measurement for at least one identically defined second time unit;

calculating a predicted dynamic network load using the at least one user network load profile for each user profile of the set of user profiles;

transferring the predicted dynamic network load to an at least one network infrastructure resource; and adjusting a capacity of the least one available network infrastructure resource.

2. The computer-implemented method of claim 1, wherein the stored at least one resource usage time measurement is normalized to a geographic reference associated with the user profile.

3. The computer-implemented method of claim 2, wherein the geographical reference is a time zone.

4. The computer-implemented method of claim 1, wherein the predicted dynamic network load is based upon parameters including an over-provisioning factor and the sum as a factor of time of at the least one user network load profile for each user profile of the set of user profiles, a standard deviation parameter and a user-profile-specific standard deviation parameter associated with each user profile of the set of user profiles.

5. The computer-implemented method of claim 4, wherein the over-provisioning factor may be reduced over time.

6. The computer-implemented method of claim 4, wherein the user-profile-specific standard deviation parameter is associated with user profiles of the set of user profiles having a non-regular network demand schedule.

7. The computer-implemented method of claim 4, further comprising:
    recording the capacity of the at least one available network infrastructure resource;
    recording the calculated predicted dynamic network load; and
    calculating an over-provisioning buffer value as the difference of the capacity of the at least one available network infrastructure resource and the predicted dynamic network load.

8. The computer-implemented method of claim 7, further comprising adjusting the over-provisioning factor based upon the calculated value of the over-provisioning buffer value.

9. The computer-implemented method of claim 1, wherein the adjustment of the capacity of the available network infrastructure resource is performed by one of a virtual machine manager or an application server.

10. A computer-program product for dynamic forecast of a network load, the computer program product comprising computer-readable instructions embodied on tangible, non-transitory media, the instructions operable when executed to:
    calculate, using at least one hardware processor, at least one user network load profile for each user profile of a set of user profiles, wherein the calculation of the at least one user network load profile includes instructions to:
        store at least one resource usage time measurement associated with the user profile for a defined first time unit as defined by at least one resource measurement value;
        calculate at least one first average resource usage time measurement and at least one first resource usage time standard deviation using the stored at least one resource usage time measurement and the at least one resource measurement value;
        calculate at least one second average resource usage time measurement utilizing the at least one first average resource usage time measurement in relation to a second defined time unit; and
        calculate at least one integrated capacity resource usage measurement for the at least one second defined time unit utilizing the at least one second average resource usage time measurement; and
        calculate an overall capacity demand change utilizing the at least one integrated capacity resource usage measurement for at least one identically defined second time unit;
    calculate a predicted dynamic network load using the at least one user network load profile for each user profile of the set of user profiles;
    transfer the predicted dynamic network load to an at least one network infrastructure resource; and
    adjust a capacity of at least one available network infrastructure resource.

11. The computer-program product of claim 10, wherein the stored at least one resource usage time measurement is normalized to a geographic reference associated with the user profile.

12. The computer-program product of claim 11, wherein the geographical reference is a time zone.

13. The computer-implemented method of claim 10, wherein the predicted dynamic network load is based upon parameters including an over-provisioning factor and the sum as a factor of time of at the least one user network load profile for each user profile of the set of user profiles, a standard deviation parameter and a user-profile-specific standard deviation parameter associated with each user profile of the set of user profiles.

14. The computer-program product of claim 13, wherein the over-provisioning factor may be reduced over time.

15. The computer-program product of claim 13, wherein the user-profile-specific standard deviation parameter is associated with user profiles of the set of user profiles having a non-regular network demand schedule.

16. The computer-program product of claim 13, further comprising:
    recording the capacity of the at least one available network infrastructure resource;
    recording the calculated predicted dynamic network load; and
    calculating an over-provisioning buffer value as the difference of the capacity of the at least one available network infrastructure resource and the predicted dynamic network load.

17. The computer-program product of claim 16, further comprising adjusting the over-provisioning factor based upon the calculated value of the over-provisioning buffer value.

18. The computer-program product of claim 10, wherein the adjustment of the capacity of the available network infrastructure resource is performed by one of a virtual machine manager or an application server.

19. A system for dynamic forecast of a network load, comprising:
    memory operable to store a set of user profiles; and
    at least one hardware processor operable to:
        calculate at least one user network load profile for each user profile of a set of user profiles, wherein the calculation of the at least one user network load profile is operable to:
            store at least one resource usage time measurement associated with the user profile for a defined first time unit as defined by at least one resource measurement value;

calculate at least one first average resource usage time measurement and at least one first resource usage time standard deviation using the stored at least one resource usage time measurement and the at least one resource measurement value;

calculate at least one second average resource usage time measurement utilizing the at least one first average resource usage time measurement in relation to a second defined time unit; and calculate at least one integrated capacity resource usage measurement for the at least one second defined time unit utilizing the at least one second average resource usage time measurement; and calculate an overall capacity demand change utilizing the at least one integrated capacity resource usage measurement for at least one identically defined second time unit;

calculate a predicted dynamic network load using the at least one user network load profile for each user profile of the set of user profiles;

transfer the predicted dynamic network load to an at least one network infrastructure resource; and adjust a capacity of at least one available network infrastructure resource.

20. The system of claim 19, wherein the stored at least one resource usage time measurement is normalized to a geographic reference associated with the user profile.

21. The system of claim 20, wherein the geographical reference is a time zone.

22. The computer-implemented method of claim 19, wherein the predicted dynamic network load is based upon parameters including an over-provisioning factor and the sum as a factor of time of at the least one user network load profile for each user profile of the set of user profiles, a standard deviation parameter and a user-profile-specific standard deviation parameter associated with each user profile of the set of user profiles.

23. The system of claim 22, wherein the over-provisioning factor may be reduced over time.

24. The system of claim 22, wherein the user-profile-specific standard deviation parameter is associated with user profiles of the set of user profiles having a non-regular network demand schedule.

25. The system of claim 22, further operable to:
record the capacity of the at least one available network infrastructure resource;
record the calculated predicted dynamic network load; and
calculate an over-provisioning buffer value as the difference of the capacity of the at least one available network infrastructure resource and the predicted dynamic network load.

26. The system of claim 25, further operable to adjust the over-provisioning factor based upon the calculated value of the over-provisioning buffer value.

27. The system of claim 19, wherein the adjustment of the capacity of the available network infrastructure resource is performed by one of a virtual machine manager or an application server.

* * * * *